US012604899B2

(12) United States Patent
Nanjee et al.

(10) Patent No.: US 12,604,899 B2
(45) Date of Patent: Apr. 21, 2026

(54) POWDER DISINFECTANT COMPOSITIONS

(71) Applicant: Onyx Lotus, LLC, Dover, DE (US)

(72) Inventors: Amyn Nanjee, Dover, DE (US); Dana Nanjee, Dover, DE (US); Gajanan Pawar, Dover, DE (US); Varun Tahlan, Dover, DE (US); Tom Johnson, Dover, DE (US)

(73) Assignee: Onyx Lotus, LLC, Dover, DE (US)

( * ) Notice: Subject to any disclaimer, the term of this patent is extended or adjusted under 35 U.S.C. 154(b) by 427 days.

(21) Appl. No.: 17/888,471

(22) Filed: Aug. 15, 2022

(65) Prior Publication Data

US 2023/0255211 A1     Aug. 17, 2023

Related U.S. Application Data

(60) Provisional application No. 63/309,964, filed on Feb. 14, 2022, provisional application No. 63/309,990, filed on Feb. 14, 2022.

(51) Int. Cl.
| | |
|---|---|
| *A01N 25/10* | (2006.01) |
| *A01N 25/12* | (2006.01) |
| *A01N 59/16* | (2006.01) |
| *A01N 59/20* | (2006.01) |
| *A01P 1/00* | (2006.01) |

(52) U.S. Cl.
CPC ............. *A01N 59/20* (2013.01); *A01N 25/10* (2013.01); *A01N 25/12* (2013.01); *A01N 59/16* (2013.01); *A01P 1/00* (2021.08)

(58) Field of Classification Search
CPC ........... A61K 33/88; A01P 1/00; A01N 25/12; A01N 59/16; A01N 59/20
See application file for complete search history.

(56) References Cited

U.S. PATENT DOCUMENTS

| | | | |
|---|---|---|---|
| 5,149,354 | A | 9/1992 | Delaney |
| 5,364,512 | A | 11/1994 | Earl |
| 5,632,904 | A | 5/1997 | Samad et al. |
| 6,217,780 | B1 | 4/2001 | Denkewicz, Jr. |
| 6,630,172 | B2 | 10/2003 | Batarseh |
| 6,838,095 | B2 | 1/2005 | Newman et al. |
| 7,001,452 | B2 | 2/2006 | Zhang et al. |
| 7,563,461 | B2 | 7/2009 | Modak et al. |
| 7,863,264 | B2 | 1/2011 | Vange |
| 7,887,749 | B2 | 2/2011 | Eldred |
| 9,034,393 | B2 | 5/2015 | Crudden |
| 9,173,972 | B2 | 11/2015 | Wooley et al. |
| 9,808,014 | B2 | 11/2017 | Amestica Salazar |

| | | | | |
|---|---|---|---|---|
| 2005/0245605 | A1 | | 11/2005 | Arata |
| 2006/0040962 | A1 | * | 2/2006 | Wang ........................ B05D 1/18 |
| | | | | 514/263.35 |
| 2009/0047364 | A1 | | 2/2009 | Crudden |
| 2009/0148540 | A1 | | 6/2009 | Martin et al. |
| 2010/0203028 | A1 | | 8/2010 | Kling et al. |
| 2013/0065960 | A1 | | 3/2013 | Suekuni et al. |
| 2014/0079588 | A1 | | 3/2014 | Tichy |
| 2016/0223255 | A1 | * | 8/2016 | Beetz ........................ A61K 9/16 |
| 2016/0362646 | A1 | * | 12/2016 | Agarkhed ............ C11D 3/3776 |
| 2019/0127668 | A1 | * | 5/2019 | Schmidt ............. C11D 17/0008 |
| 2021/0179978 | A1 | * | 6/2021 | Reinoso Garcia ....... C11D 3/33 |

FOREIGN PATENT DOCUMENTS

| | | | | | |
|---|---|---|---|---|---|
| CN | 109135936 | A | * | 1/2019 | ............. C11D 3/046 |
| EP | 2082723 | A1 | | 7/2009 | |
| EP | 2392638 | A1 | * | 12/2011 | ............. C11D 11/02 |
| WO | 95/27600 | A1 | | 10/1995 | |
| WO | 2006/098729 | A1 | | 9/2006 | |

OTHER PUBLICATIONS

Das, Chanchal, et. al; "Silver-Based Nanomaterials as Therapeutic Agents Against Coronaviruses: A Review"; International Journal of Nanomedicine; Dovepress; Internal Journal of Nanomedicine 2020; pp. 9301-9315.

"Polyvinylpyrrolidone (PVP) Surface"; nanoComposix; A Fortis Life Sciences Company; Retrieved from https://nanocomposix.com/pages/polyvinylpyrrolidone-pvp-surface#solvent-selection on Feb. 7, 2023; pp. 1-5.

Patent Cooperation Treaty; "International Search Report & Written Opinion"; Application No. PCT/US2022/040377; mailed Nov. 14, 2022; pp. 1-16.

Patent Cooperation Treaty; "International Search Report & Written Opinion"; Application No. PCT/US2022/040378; mailed Nov. 14, 2022; pp. 1-12.

Patent Cooperation Treaty; "International Search Report & Written Opinion"; Application No. PCT/US2022/040379; mailed Nov. 14, 2022; pp. 1-14.

Patent Cooperation Treaty; "International Search Report & Written Opinion"; Application No. PCT/US2022/040380; mailed Nov. 16, 2022; pp. 1-12.

\* cited by examiner

*Primary Examiner* — Kyle A Purdy
(74) *Attorney, Agent, or Firm* — Husch Blackwell LLP

(57)     ABSTRACT

The present application provides powder metal ion disinfectant compositions, methods for preparing powder metal ion disinfectant compositions, and methods of disinfecting an article and/or maintaining the pathogenic sterility of the article using the solid powder metal ion disinfectant composition. These solid powder disinfectant compositions are light stable heat stable, non-toxic, and non-corrosive, achieve a greater than 99% kill rate of a variety of pathogens for up to 60 days on a variety of surfaces, and do not contain nanoparticles.

2 Claims, No Drawings

POWDER DISINFECTANT COMPOSITIONS

CROSS-REFERENCE TO RELATED APPLICATIONS

This application claims priority to U.S. Provisional Application 63/233,161 filed on Aug. 13, 2021 and U.S. Provisional Application 63/234,593 filed on Aug. 18, 2021, each of which is hereby incorporated by reference herein.

FIELD OF THE INVENTION

The present disclosure generally relates to powder disinfectant compositions, methods of preparing the powder disinfectant compositions, and methods of using the powder disinfectant compositions. In particular, the present disclosure relates to powder disinfectant compositions comprising at least one metal ion, a chelating agent, and a hydrophilic polymer with less than 0.1 weight % (wt %) of residual water.

BACKGROUND OF THE INVENTION

The effective control of pathogens such as such as viruses, bacteria, fungus, and mold has been performed for a number of years on a variety of articles such as various PPE articles used in hospitals, doctors' offices, etc. The use of sterilized PPE articles such as gloves, aprons, gowns, and masks has been demonstrated to prevent the spread of such pathogens to various hospital personnel, doctor's office personnel, patients, and guests visiting these places.

Once a doctor, a nurse, or other hospital or doctor's office personnel come in contact with a pathogen, it becomes vital and necessary to eliminate these pathogens effectively and quickly to prevent the spread of the pathogen. In most cases, the doctor, nurse, or other healthcare personnel need to change the PPE, wash their hands, arms, etc. and replace the PPE with fresh PPE. This procedure may be performed numerous times with the same patient. Yet, the infected patient may still spread the pathogens to the doctor, nurse, or other personnel by touch, coughing, the use of improper PPE, or through the air system. Even during the current COVID epidemic, doctors, nurses, and other personnel of a hospital or doctor's office have contracted COVID or other pathogens through permeability of the PPE to these pathogens.

Therefore, there is a need for a light stable, non-toxic, and non-corrosive powder disinfectant composition that would eliminate the pathogen before coming in contact with a subject, is effective against a number of different pathogens (e.g., bacteria, mold, fungi, and viruses) on various articles including PPE articles. The light stable, non-toxic, and non-corrosive disinfectant composition would also be used in the manufacture of various articles such as PPE articles that is used by the doctors, nurses, and other personnel.

SUMMARY OF THE INVENTION

One aspect of the present disclosure encompasses a powder metal ion PPE disinfectant composition. A powder disinfectant composition comprising: (a) 0.1 wt % to 10.0 wt % of at least one metal salt; (b) 40.0 wt % to 94.9 wt % of a chelating agent; and (c) 5.0 wt % to 50 wt % of a hydrophilic polymer; wherein the powder disinfectant does not comprise nanoparticles; and wherein the powder disinfectant composition has a residual water content of less than 0.1 wt %. The hydrophilic polymer prevents oxidation of the at least one metal ion and maintains contact with a variety of surfaces, the composition achieves a greater than a 99% kill rate of a pathogen in 5 minutes or less; and is light stable, heat stable, non-toxic, and non-corrosive. Powder, as used herein, refers to a dry, bulk solid composed of a multitude of fine particles, such as finely dispersed solid particles.

Another aspect of the present disclosure encompasses a method for preparing the powder disinfectant compositions. The method comprises: (a) contacting a solid chelating agent with at least one solid metal salt forming a mixture; and (b) contacting the mixture from step (a) with a hydrophilic polymer forming the powder disinfectant composition; wherein the powder disinfectant composition does not comprise nanoparticles; and wherein the powder disinfectant composition has a residual water content of less than 0.1 wt %. The hydrophilic polymer prevents oxidation of the at least one metal ion and maintains contact with a variety of articles.

Yet another aspect of the present disclosure encompasses a method of using the powder disinfectant composition to disinfect and article and maintaining the pathogenic sterility of an article.

Other features and iterations of the invention are described in more detail below.

DETAILED DESCRIPTION OF THE INVENTION

The presently disclosed powder disinfectant compositions are capable of killing a variety of pathogens at a kill rate greater than 99% on a variety of articles and maintaining the pathogenic sterility of an article. These powder disinfecting compositions are economical, easily prepared, light stable, non-corrosive, non-toxic, exhibit antimicrobial properties, antibacterial properties, antiviral properties, antifungal properties, or a combination thereof by killing greater than 99% (99% kill rate) of the pathogens.

(I) Powder Disinfectant Compositions

The present invention relates to a powder disinfectant composition that kills pathogen, viruses, and bacteria. The composition includes a metal salt, a chelating agent, and a hydrophilic polymer whereby the metal salt with less than 0.1 wt % residual water and kills the pathogens by disrupting the cell wall or enveloping the pathogen. The hydrophilic polymer is used to attach the metal salt to the surface of the pathogen and contacts the pathogen for a period of time.

One aspect of the present disclosure encompasses powder disinfectant compositions. These powder disinfectant compositions comprise: (a) at least one metal salt; (b) a chelating agent; and (c) a hydrophilic polymer. Generally, these powder disinfectant compositions are easily prepared and economical. The powder disinfectant compositions are stable, do not contain nanoparticles and exhibit antimicrobial properties, antibacterial properties, antifungal properties, antiviral properties, or a combination thereof by killing more than 99% of pathogens on a variety articles such as personal protective equipment (PPE). The efficacy of these powder disinfectant compositions lasts for up to 60 days (i.e., the pathogenic sterility of an article is maintained for up to 60 days). In some embodiments, the pathogenic sterility of an article is maintained for up to 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 21 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days.

(a) AT LEAST ONE METAL SALT

The liquid metal ion disinfectant composition includes at least one metal salt. The at least one metal salt is a water-soluble metal salt which releases a metal ion. The metal salt may be a transition metal salt that imparts disinfectant properties.

Silver, as well as other metal ions, such as copper, zinc, gold, cobalt, nickel, zirconium, molybdenum, and palladium ions have antimicrobial properties, antibacterial properties, and antifungal properties. Salts of these ions are considered active as antimicrobial agents, antibacterial agents, and antifungal agents as long as a portion of the metal ion dissociates from the metal salt in the solvent (such as water, brine, a polar protic solvent, or combinations thereof) or in contact with a pathogen.

These metal ions react with pathogens at low ppm (parts per million levels) concentrations in various ways such as binding to the wall of the pathogen which blocks substances in or out of the pathogen, releasing active oxygen species which interacts with the pathogen, interacts with the DNA of the pathogen, and inhibit replication of the pathogen, and are transported within the cell of the pathogen and block the respiratory system destroying energy production. By contacting the pathogen with the metal ion disinfectant, the metal ion releases reactive oxygen species. Non-limiting examples of reactive oxygen species may be oxygen, a superoxide anion, a peroxide anion, a hydroxyl radical, or combinations thereof. These reactive oxygen species, once in contact with a pathogen can cause damage to cells through oxidative damage. These metal ions present positively charge surface, which interact with the negatively charged pathogen membrane and cause physical damage and membrane permeability disruption by electrostatic interactions with the pathogen.

The metal salt is a transition metal salt that imparts disinfectant properties. Non-limited examples of the transition metal salt which impart disinfectant properties may be selected from a group consisting of a silver salt, a copper salt, a zinc salt, a gold salt, a cobalt salt, a nickel salt, a zirconium salt, a molybdenum salt, a palladium salt, and combinations thereof. The anion of the at least one metal salt may have an organic or an inorganic anion. Non-limiting examples of the metal salt may be silver nitrate, silver acetate, silver bromide, silver sulfate, silver citrate, silver oxalate, copper (II) acetate, copper (II) sulfate, copper (I) chloride (II) carbonate, zinc chloride, zinc nitrate, zinc acetate, zinc sulfate, gold acetate, gold chloride, cobalt (II) sulfate, cobalt (II) chloride, cobalt (II) nitrate, cobalt (II) carbonate, nickel chloride, nickel sulfate, zirconium (IV) nitrate, zirconium (IV) acetate, molybdenum (II) chloride, molybdenum (V) chloride, and palladium (II) chloride In some embodiments, the powder disinfectant composition includes a silver salt, a copper salt, a zinc salt, or a combination thereof. In another embodiment, the powder disinfectant composition includes a silver salt. In these embodiments, the powder disinfectant composition includes a silver salt which is capable of releasing a silver cation such as $Ag^+$ but potentially $Ag^{2+}$, $Ag^{3+}$ in addition to $Ag^+$ Suitable, non-limiting examples of silver salts may be silver chloride, silver bromide, silver fluoride ($AgF$, $AgF_2$, and/or $Ag_2F$), silver iodide, silver citrate, silver lactate, silver phosphate, silver carbonate, silver sulfate, silver trifluoroacetate, silver acetate, silver nitrate, silver sulfide, silver oxide, silver perchlorate, and combinations thereof. In some preferred embodiments, the silver salt is silver nitrate.

In general, the metal salt can be present in an amount ranging from about 0.1 wt % to about 10.0 wt % based on the total weight of the liquid disinfectant composition. In various embodiments, the at least one metal salt can be present in an amount ranging from about 0.1 wt % to about 10.0 wt %, from about 0.5 wt % to about 9.0 wt %, from about 1.0 wt % to about 8.0 wt %, from about 3.0 wt % to about 8.0 wt %, or from about 4.0 wt % to about 6.0 wt % based on the total weight of the liquid disinfectant composition.

In general, the metal salt may be present in an amount ranging from about 0.20 mole % to about 3.5 mole %. In various embodiments, the at least one metal salt may be present in an amount ranging from about 0.2 mole % to about 3.5 mole %, from about 0.5 mole % to about 3.0 mole %, or from about 1.0 mole % to about 2.0 mole %.

(b) A CHELATING AGENT

The powder disinfectant composition includes a chelating agent. The chelating agent interacts with the at least one metal ion to form a complex which stabilizes the at least one metal ion.

The chelating agent is selected from a group consisting of citric acid, a citrate salt, tartaric acid, a salt of tartaric acid, ascorbic acid, an ascorbate salt, a polyaminocarboxylic acid, a salt of a polyaminocarboxylic acid, an organic compound, and combinations thereof.

In some embodiments, the chelating agent may be citric acid or a salt of citric acid. Non-limiting examples of salt of citric acid may be sodium citrate (also referred to as trisodium citrate), potassium citrate, ammonium citrate, magnesium citrate, and potassium magnesium citrate. In one embodiment, the chelating agent may be sodium citrate (trisodium citrate).

In other embodiments, the chelating agent may be ascorbic acid or an ascorbate salt. Non-limiting examples of suitable ascorbate salts may be sodium ascorbate, calcium ascorbate, ammonium ascorbate, and potassium ascorbate.

In other embodiments, the chelating agent may be tartaric acid or a salt of tartaric acid. Non-limiting examples of suitable salts of tartaric acid may be sodium tartrate, calcium tartrate, and ammonium tartrate.

In still other embodiments, the chelating agent may be a polyaminocarboxylic acid. Suitable, non-limiting examples of polyaminocarboxylic acid may be iminodiacetic acid (IDA), nitrilotriacetic acid (NTA), ethylenediaminetetraacetic acid (EDTA), diethylenetriaminepentaacetic acid (DTPA), ethylene glycol-bis(β-aminoethyl ether)-N,N,N', N'-tetraacetic acid (EGTA), 1,2-bis(o-aminophenoxy)ethane-N,N,N',N'-tetraacetic acid (BAPTA), 1,4,7-triazacyclononane-1,4,7-triacetic acid (NOTA), 2,2',2'',2'''-(1,4,7,10-tetraazacyclododecane-1,4,7,10-tetrayl)tetraacetic acid (DOTA), (2S)-1-[(3S)-3-{[(3S)-3-amino-3-carboxypropyl] amino}-3-carboxypropyl]azetidine-2-carboxylic acid, ethylenediamine-N,N'-bis(2-hydroxyphenylacetic acid (EDDHA), ethylenediamine-N,N'-disuccinic acid (EDDS), and combinations thereof. The polyaminocarboxylic acid may be a free polyaminocarboxylic acid, a salt of the polyaminocarboxylic acid (polyaminocarboxylate), or a combination thereof. The polyaminocarboxylate salts may be an alkali metal salt, an alkali earth metal salt, or an organic salt. In one embodiment, the polyaminocarboxylic acid is ethylenediaminetetraacetic acid, a salt of an ethylenediaminetetraacetic acid, or a combination thereof. Suitable, non-limiting examples of ethylenediaminetetraacetic acid salts may be monolithium ethylenediaminetetraacetic acid, disodium ethylenediaminetetraacetic acid, diammonium ethylenediaminetetraacetic acid, tetrasodium ethylenediaminetetraacetic acid, monocalcium ethylenediaminetetraacetic acid, and monobarium ethylenediaminetetraacetic acid. In one embodiment, the chelating agent is ethylenediaminetetraacetic acid.

In yet other embodiments, the chelating agent may be an organic compound. Suitable, non-limiting examples of organic compounds may be group consisting of formic acid, glyoxilic acid, oxalic acid, acetic acid, glocolic acid, acrylic acid, pyruvic acid, malonic acid, propanoic acid, hydroxypropanoic acid, lactic acid, glyceric acid, fumaric acid, maleic acid, oxaloacetic acid, crotonoic acid, acetoacetic acid, 2-oxobutanoic acid, methylmalonic acid, succinic acid, methylsuccinic acid, malic acid, tartaric acid, dihydroxytartaric acid, butanoic acid, hydroxybutanoic acid, itaconic acid, mesaconic acid, oxoglutaric acid, glutaric acid, valeric acid, pivalic acid, aconitic acid, ascorbic acid, citric acid, isocitric acid, adipic acid, caproic acid, benzoic acid, salicylic acid, gentisic acid, protocatechuic acid, gallic acid, cyclohexanecarboxylic acid, pimelic acid, phthalic acid, terephthalic acid, phenylacetic acid, toluic acid, mandelic acid, suberic acid, octanoic acid, cinnamic acid, nonanoic acid, salts thereof, and combinations thereof.

In cases in which the powder disinfectant composition includes a salt of the chelating agent, the salt of the chelating agent may be added directly as a solid or prepared in-situ by titrating chelating agent with an appropriate base such as sodium hydroxide.

Generally, the chelating agent may be present in an amount ranging from about 40.0 wt % to about 94.9 wt % based on the total weight of the liquid disinfectant composition. In various embodiments, the at least one metal salt can be present in an amount ranging from about 40.0 wt % to about 94.9 wt %, from about 50.0 wt % to about 90.0 wt %, from about 55.0 wt % to about 80.0 wt %, from about 60.0 wt % to about 75 wt %, or from about 65.0 wt % to about 70.0 wt % based on the total weight of the liquid disinfectant composition.

In general, the chelating agent may be present in an amount ranging from about 96.0 mole % to about 99.6 mole %. In various embodiments, the chelating agent may be present in an amount ranging from about 96.0 mole % to about 99.6 mole %, from about 97.0 mole % to about 99.0 mole %, or from about 98.2 mole % to about 98.6 mole %.

Generally, the weight ratio of the chelating agent to the metal salt ranges from about 200.0:1.0 to about 20.0:1.0. In various embodiments, the weight ratio of the chelating agent to the metal salt ranges from about 200.0:1.0 to about 20.0:1.0, from about 150.0:1.0 to about 40.0:1.0, or from about 100.0:1.0 to about 50.0:1.0. In one embodiment, the weight ratio of the chelating agent to the metal salt is about 125.0:1.0. In another embodiment, the weight ratio of the chelating agent to the metal salt is about 100.0:1.0. In still another embodiment, the weight ratio of the chelating agent to the metal salt is about 50.0:1.0. In yet another embodiment, the weight ratio of the chelating agent to the metal salt is about 40.0:1.0. In still another embodiment, the weight ratio of the chelating agent to the metal salt is about 20.0:1.0.

(c) A HYDROPHILIC POLYMER

The powder disinfectant composition includes a hydrophilic polymer. The hydrophilic polymer interacts with the metal salt or the chelated metal ion and provides stability to the metal salt and the hydrophilic polymer prevents oxygen and/or moisture from interacting with the metal ion. The hydrophilic polymer has high polarity and propensity to form hydrogen bonds with various hydrogen donors such as phenols, carboxylic acids, anionic dyes, and inorganic salts. With this hydrogen bonding, the hydrophilic polymer interacts with the complex of the metal ion and the metal ions chelated complex through ionic and/or Van der Walls interactions of the oxygen atom on the hydrophilic polymer and prevents oxygen (02) and/or water forming a metal oxide from interacting with the metal ion. This interaction not only stabilizes the complex but also increases the shelf-life of the powder disinfectant composition.

Various hydrophilic polymers are widely known to impart antimicrobial properties to the composition, such as poly (vinyl pyrrolidone). With the inclusion of the hydrophilic polymer in the disinfectant composition, the hydrophilic polymer may provide a synergistic effect to the disinfectant composition.

The hydrophilic polymer, as utilized in the powder disinfectant composition, does not evaporate at any appreciable rate.

A wide range of hydrophilic polymers may be used in the powder disinfectant composition. Suitable, non-limiting examples of hydrophilic polymers may be selected from a group consisting of a polyacrylamide, a poly(acrylamide-co-acrylic acid), poly(vinyl alcohol), poly(vinyl pyrrolidone) such as low and high molecular weight poly(vinyl pyrrolidone), poly(ethylene oxide), water soluble polyurethane, carboxy methyl cellulose, lipids such as glycerolipids, fatty acid lipid polymers, oligosaccharides, glycerols, or combinations thereof. In certain embodiments, the hydrophilic polymer useful in the powder disinfectant composition is poly(vinylpyrrolidone) (PVP). In one embodiment, the hydrophilic polymer is poly(vinylpyrrolidone) K-30.

In general, the hydrophilic polymer may be present in an amount ranging from about 5.0 wt % to about 50.0 wt % based on the total weight of the powder disinfectant composition. In various embodiments, the at least one metal salt can be present in an amount ranging from about 5.0 wt % to about 50.0 wt %, from about 10.0 wt % to about 45.0 wt %, from about 15.0 wt % to about 40.0 wt %, from about 20.0 wt % to about 35.0 wt %, or from about 25.0 wt % to about 30.0 wt % based on the total weight of the powder disinfectant composition.

Generally, the hydrophilic polymer may be present in an amount ranging from about 0.002 mole % to about 0.50 mole %. In various embodiments, the hydrophilic polymer may be present in an amount ranging from about 0.20 mole % to about 0.50 mole %, from about 0.25 mole % to about 0.45 mole %, or from about 0.30 mole % to about 0.40 mole %.

In general, the weight ratio of the hydrophilic polymer to the at least one metal salt ranges from about 30.0:1.0 to about 10.0:1.0. In various embodiments, the weight ratio of the hydrophilic polymer to the at least one metal salt ranges from about 30.0:1.0 to about 10.0:1.0, from about 25.0:1.0 to about 15.0:1.0, or from about 20.0:1.0 to about 17.5:1.0.

(d) ADDITIVES

The powder disinfectant composition may optionally include an additive. The additive may be included to enhance in the release of the metal cation from the salt. Generally, the additive is a surfactant. The surfactant may be a cationic surfactant, an anionic surfactant, a nonionic surfactant, a zwitterionic surfactant, a nonionic surfactant, or a combination thereof.

Non-limiting examples of surfactants may be sulphonates, alkyl sulfates, alkylphenol s, ethoxylated aliphatic alcohols, polyoxyethylenes, carboxylic esters, polyethylene glycol esters, fatty acid glycerol esters, quaternary ammonium salts, and so forth. In some embodiments, the surfactant is selected from a group consisting of benzalkonium chloride, cetalkonium chloride, cetrimonium bromide, cetrimonium chloride, sodium lauryl sulfate, sodium cocoyl isethionate, sodium dodecyl benzene sulfonate, sodium methyl oleoyl taurate, sodium lauryl sulfoacetate, sodium C14-16 olefin sulfonate, disodium lauryl sulfosuccinate, cocamidopropyl betaine, lauramide MEA, sucrose stearate, cetyl alcohol, laureth-3, polysorbate-85, sorbitan monolaurate, PEG-30 castor oil, PEG-6 cocamide, distearyl dimethyl ammonium chloride, tetramethyl ammonium chloride, tetraethylammonium chloride, and combinations thereof.

(e) EXEMPLARY EMBODIMENT

In some embodiment, the at least one metal salt is a silver salt and is presented at 0.01 wt % to 10.0 wt %; the chelating agent is trisodium citrate or ethylenediaminetetraacetic acid and is presented at 40 wt % to 94.9 wt %; and the hydrophilic polymer is PVP K-30 and is presented at 5.0 wt % to 50.0 wt %.

In certain embodiment, the at least one metal salt is a silver salt and is presented at 0.1 wt % to 2.0 wt %; the chelating agent is trisodium citrate and is presented at 60 wt % to 75.0 wt %; and the hydrophilic polymer is PVP K-30 and is presented at 25.0 wt % to 35.0 wt %.

In certain embodiment, the at least one metal salt is a silver salt and is presented at 0.01 wt % to 2.0 wt %; the chelating agent is ethylenediaminetetraacetic acid and is presented at 7.0 wt % to 75.0 wt %; and the hydrophilic polymer is PVP K-30 and is presented at 2.5 wt % to 30.0 wt %.

(f) PROPERTIES OF THE POWDER DISINFECTANT COMPOSITION

The powder disinfectant composition, as disclosed herein, has many unique properties.

The powder disinfectant composition has an average particle size from about 1.0 micron to about 1000 microns. In various embodiments, the powder disinfectant composition has an average particle size from about 1.0 micron to about 1000 microns, from about 1.0 micron to about 500 microns, from about 1.0 micron to about 250 microns, or from about 1.0 micron to about 100 microns. In one embodiment, the powder disinfectant composition has an average particle size from about 1.0 micron to about 100 microns.

The powder disinfectant composition, as disclosed herein, does not contain nanoparticles in the composition. Examples of the disinfectant composition have been evaluated by ultraviolet (UV)-visible spectroscopy by dissolving the powder disinfectant composition in water. Nanoparticles have unique optical properties that are sensitive to the size, shape, concentration, agglomeration state, and refractive index near the nanoparticle surface, which makes UV-Vis a valuable tool for identifying, characterizing, and studying nanomaterials. Generally, nanoparticles provide colored solution which is in indication of nanoparticles.

Since nanoparticles are considered toxic, the presence of such nanoparticles would render the powder disinfectant toxic. Nanoparticles have the ability to cross biological membranes and access cells, tissues and organs that larger-sized particles which normally cannot. Once nanoparticles gain access to the blood stream via inhalation, ingestion, or through a cut, the nanoparticles might lead to both geno-toxicity and biochemical toxicity. Also, once the nanoparticles gain access to the xylem and phloem of a plant, the nanoparticles can provide some positive attributes such as accelerated growth, enhanced yield, lower use of fertilizer, etc. as well as remain present in the plant Yet, the use of nanoparticles also affects soil health, environmental quality, aquatic life, and animal's health. Moreover, the accelerated use of nanomaterials has greatly raised the concerns about the toxicity in food safety and ecosystem. In order to verify that the powder disinfectant compositions do not contain nanoparticles, as disclosed herein, the compositions were evaluated by an analytical method, such as UV-vis spectrometry. Since the powder disinfectant composition do not contain nanoparticles, these powder disinfectant compositions are considered non-toxic.

The powder disinfectant composition, once dissolved in an aqueous solvent, has a pH that ranges from about 6 to about 8. As such, these compositions are considered neutral and non-corrosive. Given its neutral and non-corrosive properties, the metal ion disinfectant composition can be used on various articles without causing the article to deteriorate or decompose. The powder disinfectant composition of the present disclosure may additionally be in contact with skin, animals, fruits, vegetables, or plants without any harmful side effects.

The powder disinfectant composition exhibits antimicrobial properties, antibacterial properties, antiviral properties, antifungal properties, or a combination thereof against a variety of pathogens as verified by the following tests: for bacteria and viruses: AOAC Use Dilution Method (UDM), ASTM E 2315, ISO 22196:2011; and for viruses: ASTM 1053, AATCC 100-20124, ISO18184:2019, ISO 21702: 2019, Rt-PCR, liquid-liquid contact. For fungi, the ASTM E1052 was utilized. The kill rate of the pathogens is greater than 99% after less than a 5-minute period and can maintain their pathogenic sterility for greater than 1 day.

The powder disinfectant compositions are heat stable and light stable. Even under accelerated stability conditions, the powder disinfectant composition remain highly active by maintaining their kill rate and remains as a powder.

(II) Methods of Preparing Powder Disinfectant Compositions

In another aspect, the present disclosure provides method of preparing a powder disinfectant composition. The method comprises contacting: (a) a solid chelating agent with at least one solid metal salt forming a mixture; and (b) contacting the mixture from step (a) with a hydrophilic polymer forming the powder metal ion disinfectant composition; wherein the powder disinfectant does not comprise nanoparticles; wherein the hydrophilic polymer prevents oxidation of the at least one metal ion and maintains contact with a variety of surfaces; and wherein the powder disinfectant composition has a residual water content of less than 0.1 wt %. The method, as described above, is economical, easily performed, scalable, and produces a highly effective powder disinfectant composition.

The methods, as disclosed herein, may be conducted in batch or semi batch mode. The methods are conducted in the dark and under an inert atmosphere. These conditions are necessarily to prevent oxidation of the at least one solid metal salt. Various methods of mixing are known in the art for mixing solids. Non-limiting methods include but are not limited to magnetic stirring, mechanical stirring, or paddle mixing.

(a) Contacting a Solid Chelating Agent with at Least One Solid Metal Salt Forming a Mixture The first step in the method encompasses contacting a solid chelating agent with at least one solid metal salt forming a mixture. Suitable metal salts and chelating agents are described in more detail above.

The temperature of mixing in step (a) may ranges from about 0° C. to about 50° C. In various embodiments, the temperature of mixing in step (a) ranges from about 0° C. to about 50° C., from about 10° C. to about 35° C., or from about 20° C. to about 30° C. In an embodiment, the temperature of mixing in step (a) is about 23° C. (room temperature).

The duration of mixing ranges from about 1 minutes to about 5 minutes until a well dispersed is obtained by visual determination. In various embodiments, the duration of mixing ranges from about 1 minutes to about 5 minutes, from about 2 minutes to about 4 minutes, or from about 2.5 minutes to about 3.0 minutes until a well dispersed is obtained by visual determination.

(b) Contacting the Mixture from Step (a) with a Hydrophilic Polymer Forming the Powder Metal Ion Disinfectant Composition The next step in the method comprises contacting the mixture from step (a) with a hydrophilic polymer forming the powder disinfectant composition. Suitable hydrophilic polymers are described above.

The temperature in step (b) ranges from about 0° C. to about 50° C. In various embodiments, the temperature in step (b) ranges from about 0° C. to about 50° C., from about 10° C. to about 35° C., or from about 20° C. to about 30° C.

The duration of step (b) ranges from about 1 minute to about 10 minutes. In various embodiments, the duration of step (b) ranges from about 1 minute to about 10 minutes, from about 2 minutes to about 9 minutes, or from about 3 minutes to about 5 minutes.

After the step (b) is complete, powder disinfectant composition is produced that does not contain nanoparticles. The solid powder disinfectant composition may be stored for more than a month under nitrogen without loss of efficacy or development of color.

The powder disinfectant composition may be dissolved in a solvent such as water and used as a liquid disinfectant composition.

(III) Methods for Disinfecting an Article

In another aspect, the present disclosure provides methods of disinfecting an article. The method comprises contacting the article with the powder disinfectant composition. Alternatively, the method comprises producing the article with the powder disinfectant composition. The powder disinfectant composition may be dissolved in a suitable solvent such as water and the aqueous solution of the disinfectant composition is contacted with the article. Alternately, the method further comprises producing an article with the liquid disinfectant composition produced from the powder disinfectant composition.

(a) Powder Disinfectant Compositions

The powder disinfectant compositions are described in more detail above.

(b) Articles

The powder disinfectant composition may be applied or produced into various articles. The articles may be porous or non-porous. The articles may be made from a variety of materials and such as but not limited to metal, latex, paper, cloth, and plastic. Non-limiting examples of these articles may be metals or metal alloys (for example, steel, stainless steel, iron), wood, cardboard. glass, plastic, thermoplastic, ceramic, natural stone (for example, granite, marble, quartz, quartzite), synthetic stone, concrete, sheet rock, livestock living spaces (such as a barn, coup, a stable, and the like), fruits, vegetables, eggs, seeds, raw meat surfaces, and the like. Non-limiting examples of these articles may be dairy products, animal feed, pet feed, water, and the like.

The article may be located in a hospital or a doctor's office and used for health care. The powder disinfectant composition may be applied to a catheter, furniture, floors, linens, drapes, wheelchairs, walkers, etc. in order to disinfect these articles. These articles will remain disinfected for a period of up to 60 days, even after numerous touches by a human. In some embodiments, the articles will remain disinfected for up to 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 21 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days.

The powder disinfectant composition, as a powder or a liquid, may be used in health care and may be used either in-vivo or in-vitro. Non-limiting examples of in-vitro uses may be sterilization of medical surgical equipment or surgical instruments (such as a probe forceps, respirators, etc.), disinfection of hands and/or extremities such as a surgical handwash or surgical scrub; wound care, and plasma preservation. Non-limiting examples of in-vivo uses may be medical textiles (such as gauze, etc.), nasal sprays, irrigation solutions, tablet coatings, medical implants or devices, and dental uses such as dental crowns, dental implants, etc. The disinfecting composition may be applied directly to a wound or an incision the covered by a bandage; or applied to a bandage or gauze then directly applied to a wound or incision. This application would reduce the time for healing of the wound or incision.

The article may be personal protective equipment (PPE). The powder disinfectant composition may be applied as a liquid or a solid to the internal surface or external surface of a face mask or respirator, gloves, mask, and aprons.

The article may be an air filter. The powder disinfectant composition may be applied as a liquid or a solid to the internal surface or external surface air filter.

The article may be in a home, a housing structure, or a building. Suitable, non-limiting examples of these articles may be a wood table, a counter surface (Formica, stainless steel, quartz, granite, etc.), a faucet (stainless steel, chromed steel), a shower head, a floor (such as a bathroom floor), tiles, sinks, showers, toilets, tubs, railings, door handles, doors, dishwashing machines, cloths driers, etc. After the article is treated with the metal ion disinfectant composition, these articles will remain disinfected for a period of up to 60 days. In some embodiments, the articles will remain disinfected for up to 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 21 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, or 60 days.

The article may be a food container, food packaging, or a food preservative. The powder composition, as a solid or a liquid, may be applied directly to a food container or food packaging material to prevent microbial growth and extend the freshness of the food such as meat, poultry, eggs, and cheese. Suitable, non-limiting examples of these food container or food packaging may be plastic wrap, aluminum foil, a stainless-steel container, plastic containers, glass containers, plastic deli containers, etc. The powder disinfectant composition may be directly applied to the external surface of fresh meat or fresh seafood such as goat, beef, chicken, pork, turkey, duck, lobsters, fish, and alike. By applying the powder disinfectant composition, the pathogens present on the surface will be eliminated. As a food preservative or in can preservative, the powder disinfectant composition may be sprayed or included before canning or bottling of a meat, fruit, or vegetable, or as an additive after the meat, fruit, or vegetable is introduced into the can or bottle.

The article may be a building material. After applying the powder disinfectant composition as a powder or a liquid, the building material can easily be used without the fear of mold or bacteria growth in the future. Suitable, non-limiting examples may be wood, paper, sheet rock, iron, wall paper, stainless steel, etc.

The article may be water. The addition of the powder disinfectant composition would aid in the potability of water and use in sanitation. The addition of the powder disinfection solution would kill the pathogens and make the water suitable to drink or used in washing.

The article may be a polymer, a thermoplastic, or a plastic. The powder disinfectant composition may be added before the polymer, the thermoplastic, or the plastic is produced (in the production process) or after the polymer, the thermoplastic, or the plastic is produced. Suitable, non-limiting examples may be a toy, a polymer coated counter surface, a plastic item, a toy, a plastic film, etc.

The article may be article already effected by bacteria or mold. By applying the powder metal disinfectant composition as a powder or a liquid, the bacteria or mold would be eliminated, and the article could be used once again. Suitable, non-limiting examples may be a moldy bathroom wall, moldy sheet rock, a moldy bathroom floor, a moldy pipe, etc.

The powder disinfectant composition, as a powder or liquid, may be added to or applied to paint, caulk, varnish, and concrete. The paint, caulk, varnish, and concrete would not only eliminate pathogens already present on the surface of the surface or article but also prevent pathogens from growing in the future.

(c) Applying the Disinfectant Composition

The powder disinfectant composition as a solid or liquid may be applied in various techniques. The powder disinfectant composition may be applied using various techniques, but are not limited to spray coating, dip coating, doctor-blade coating, spin coating, air knife coating, single and multilayer slide coating, gap coating, knife-over-roll coating, metering rod (Meyer bar) coating, reverse roll coating, rotary screen coating, extrusion coating, casting, using a paint brush, wiping, or printing. The composition may be rapidly sprayed or cast in thin layers over large areas or sprayed and coated numerous times on the surface or article.

As a solid, the powder disinfectant composition may be included during the production of the article such as PPE gloves. As an example, the powder disinfectant composition may be incorporated into a liquid monomer, liquid monomer, a liquid-phase prepolymer, or a polymer melt in the fabrication or production of an article such as PPE: gloves, such as latex gloves, vinyl gloves, or nitrile rubber glove.

As a solid, the disinfectant composition may be applied in various methods. Non-limiting methods or applying a solid are dry spraying, rolled, or cast.

(d) Properties of Articles after Contacting the Disinfectant Composition as a Liquid or a Solid The articles, after being disinfected by the PPE composition would kill greater than 99% of the pathogens present as compared to articles that have not been treated and maintain the pathogenic sterility for greater than 1 day. These articles can be directly used since the powder disinfectant compositions are light stable, heat stable, non-toxic, and non-corrosive.

Definitions

Unless defined otherwise, all technical and scientific terms used herein have the meaning commonly understood by a person skilled in the art to which this invention belongs.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention.

Reference throughout this specification to "one embodiment," "some embodiments", "certain embodiments," "one or more embodiments," or "an embodiment" means that a particular feature, structure, material, or characteristic described in connection with the embodiment is included in at least one embodiment of the invention. Thus, the appearances of phrases containing the term "embodiment(s)" in various places throughout this specification are not necessarily referring to the same embodiment of the invention. Furthermore, the particular features, structures, materials, or characteristics may be combined in any suitable manner in one or more embodiments.

In the present disclosure, "%" refers to "weight % (wt. %)" or "mass %", unless otherwise stated.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

As used herein, the phrase "consisting of excludes any element, step, or ingredient not specified in the claim. When the phrase "consists of (or variations thereof) appears in a clause of the body of a claim, rather than immediately following the preamble, it limits only the element set forth in that clause; other elements are not excluded from the claim as a whole. As used herein, the phrase "consisting essentially of limits the scope of a claim to the specified elements or method steps, plus those that do not materially affect the basis and novel characteristic(s) of the claimed subject matter.

When introducing elements of the embodiments described herein, the articles "a", "an", "the" and "said" are intended to mean that there are one or more of the elements.

The terms "comprises", "comprising", or any other variations thereof used in the disclosure, are intended to cover a non-exclusive inclusion, such that a device, apparatus, system, assembly, method that comprises a list of components or a series of steps that does not include only those components or steps but may include other components or steps not expressly listed or inherent to such apparatus, or assembly, or device. In other words, one or more elements or steps in a system or device or process proceeded by "comprises . . . a" or "comprising . . . of does not, without more constraints, preclude the existence of other elements or additional elements or additional steps in the system, device, or process as the case may be. Besides, the use of "comprising", "consisting" or "including" also contemplates embodiments that "consist essentially of or "consist of the recited formulation and steps of preparation of the formulation.

As various changes could be made in the above-described methods without departing from the scope of the invention, it is intended that all matter contained in the above description and in the examples given below, shall be interpreted as illustrative and not in a limiting sense. The terms "comprises", "comprising", or any other variations thereof used in the disclosure, are intended to cover a non-exclusive inclusion, such that a device, apparatus, system, assembly, method that comprises a list of components or a series of steps that does not include only those components or steps but may include other components or steps not expressly listed or inherent to such apparatus, or assembly, or device. In other words, one or more elements or steps in a system or device or process proceeded by "comprises . . . a" or "comprising . . . of does not, without more constraints, preclude the existence of other elements or additional elements or additional steps in the system, device, or process as the case may be. Besides, the use of "comprising", "consisting" or "including" also contemplates embodiments that "consist essentially of or "consist of the recited formulation and steps of preparation of the formulation.

As used herein, the term "powder," in all of its forms, refers to a dry, bulk solid composed of a multitude of fine particles, such as finely dispersed solid particles. The powder may be characterized by an average particle size of from about 1.0 micron to about 1000 microns, or from about 1.0 micron to 100 microns.

As used herein, the term "nanoparticle," in all of its forms, refers to a particle characterized by a particle size of less than one micron. The use of the term in this application refers to particles having a size that are not desirous in the composition because they may be toxic to the user.

As used herein, the term "light stable", in all of its forms, refers to the disinfectant composition not losing efficacy or potency in the presence of light either sunlight or manmade light.

As various changes could be made in the above-described methods without departing from the scope of the invention, it is intended that all matter contained in the above description and in the examples given below, shall be interpreted as illustrative and not in a limiting sense.

EXAMPLES

While the present invention is disclosed in reference to the preferred embodiments or examples above, it is to be understood that these embodiments or examples are intended for illustrative purposes, which shall not be treated as limitations to the present invention. It is contemplated that modifications and combinations will readily occur to those skilled in the art, which modifications and combinations will be within the spirit of the invention and the scope of the following claims.

Materials and Instruments:

The following materials were sourced in the Examples noted below: Trisodium citrate was sourced from Analab Fine Chemicals, Gujarat, India and used without further purification. The purity of the trisodium citrate was 99%. Ethylenediamine tetraacetic acid (EDTA) was sourced from Analab Fine Chemicals, Gujarat, India and used without further purification. The purity of the EDTA was 99%. Silver nitrate was sourced from Rochester Silver, Rochester, N.Y., Alpha Chemika, or Sigma Aldrich and used without further purification. The minimum assay of silver nitrate was 99% minimum. Polyvinylpyrrolidone K-30 (PVP K-30) was sourced from Alpha Chemika and used directly without further purification.

The pH of the powder disinfectant composition was determined using a Systonic digital auto pH meter with Combination pH Electrode calibrated with a pH 7.0 buffer by dissolving 1.0 g of the powder disinfectant composition in 10.0 mL if distilled water. The concentration of silver ions in the samples was determined by an inductively coupled plasma optical emission spectrometry (ICP-OES) method or potentiometric titration using 1 drop nitric acid and titrating with 100 ppm solution of sodium chloride. The presence of nanoparticles was determine using ultraviolet (UV)-visible spectroscopy.

Example 1: General Procedure for Preparation of Powder Disinfectant Compositions The general preparations, as disclosed below, were all conducted in the dark and under nitrogen.

Into a flask equipped with magnetic stirring bar under a nitrogen atmosphere at room temperature was placed the chelating agent. The metal salt was added in portions to the chelating agent. The mixture was stirred for 5 minutes at room temperature. Then, hydrophilic polymer was added portion wise into the mixture the metal salt and the chelating agent. This mixture was stirred for an additional 5 minutes until a white solid was obtained. The powder was stored in a sealed plastic bottle under nitrogen and stored at ambient temperatures. The residual water was determined through Karl Fisher analysis.

Example 2: ASTM E-2315 Test to Assess the In Vitro Reduction of a Microbial Population of Test Organisms after Exposure to the Powder Disinfectant Composition An ASTM E-2315 was conducted under guidelines of the AOAC (Association of Official Analytical Chemists). A pure culture of *Escherichia Coli* (*E. Coli*, ATCC 25922) was streaked on Soyabean Casein Digest Agar plates and allowed to incubate at 37° C. for up to 2 days. Following incubation, the surface of agar plate was scraped, and the growth suspension was adjusted to a concentration of 106 cfu/ml. Test samples contained the powder disinfectant composition while control samples did not contain the powder disinfectant composition, Test and control substances were dispensed in identical volumes to sterile test tubes. Independently, test and control substances were inoculated with the test microorganism, mixed, and incubated. Control suspensions were immediately plated to represent the concentration present at the start of the test, or time zero and at the conclusion of each contact time; a volume of the liquid test solution was neutralized. Dilutions of the neutralized test solution were placed on to appropriate agar plates and incubation temperatures to determine the surviving microorganisms at the respective contact times and reductions of microorganisms were calculated by comparing initial microbial concentrations to surviving microbial concentrations.

Example 3: Preparation of Powder Disinfecting Composition of Trisodium Citrate, Silver Nitrate, and PVP K-30

The preparation of the powder disinfectant composition containing trisodium citrate, silver nitrate, and PVP K-30 was conducted according to the general preparation as shown in Example 1. Table 1 shows the amounts of the trisodium citrate, silver nitrate, and PVP K-30 used in the preparation.

TABLE 1

Powder Disinfectant Composition using Trisodium Citrate, Silver Nitrate, and PVP K-30.

| Experiment # | Trisodium Citrate (g) | AgNO$_3$ (g) | PVP-K-30 (g) | Ppm silver* |
|---|---|---|---|---|
| 1 | 5.0 g | 0.05 g | 1.0 g | 500 ppm |
| 2 | 2.0 g | 0.05 g | 1.0 g | 500 ppm |
| 3 | 2.5 g | 0.05 g | 1.0 g | 500 ppm |
| 4 | 2.0 g | 0.1 g | 2.0 g | 1,000 ppm |

PVP K-30: Polyvinyl pyrrolidine K-30.
*The concentration of silver ions in the samples was verified by an inductively coupled plasma optical emission spectrometry (ICP-OES) or potentiometric titration. Residual water was determined through Karl Fisher analysis and all samples showed less than 0.1 wt % residual water. This general example demonstrates that the order of addition is important to prepare the powder disinfectant composition.

Example 4: Experimental Results for ASTM E-2315 Evaluation

Each sample from Table 1 above underwent ASTM E-2315 evaluation. Each sample showed 99.9999% reduction on exposure to *Escherichia coli* when exposed for just 15 seconds, thereby demonstrating instant killing activity of the composition as compared to the control. Similar tests were conducted *Staphylococcus aureus* (ATCC 25923) and *Pseudomonas aeruginosa* (ATCC 9027) showing the same instant kill rate of the composition as compared to the control.

Example 5: Preparation of Powder Disinfecting Composition of EDTA, Silver Nitrate, and PVP K-30

The preparation of the powder disinfectant composition containing EDTA, silver nitrate, and PVP K-30 was conducted according to the general preparation as shown in Example 1. Table 2 shows the amounts of the EDTA, silver nitrate, and PVP K-30 used in the preparation.

TABLE 2

| Experiment # | Formulation # | Amount EDTA (g) | Amount AgNO$_3$ (g) | Amount PVP K-30 (g) | Ppm silver* |
|---|---|---|---|---|---|
| 1 | 1 | 1.25 | 0.05 | 0.5 | 500 |
| 2 | 2 | 1.25 | 0.01 | 0.5 | 100 |
| 3 | 3 | 2.5 | 0.02 | 1.0 | 100 |
| 4 | 4 | 1.25 | 0.01 | 0.5 | 200 |
| 5 | 5 | 2.5 | 0.02 | 1.0 | 200 |
| 6 | 6 | 2.5 | 0.02 | 1.0 | 200 |
| 7 | 7 | 2.5 | 0.02 | 1.0 | 200 |
| 8 | 8 | 2.5 | 0.02 | 1.0 | 200 |

EDTA: ethylenediaminetetraacetic acid.
PVP K-30: Polyvinyl pyrrolidine K-30.
*The concentration of silver ions in the samples was verified by an inductively coupled plasma optical emission spectrometry (ICP-OES) or potentiometric titration. Residual water was determined through Karl Fisher analysis and all samples showed less than 0.1 wt % residual water.

Example 4: Experimental Results for ASTM E-2315 Evaluation

Each sample from Table 1 above underwent ASTM E-2315 evaluation. Each sample showed 99.999999% reduction on exposure to *Escherichia coli* when exposed for just 15 seconds, thereby demonstrating instant killing activity of the composition as compared to the control. Similar tests were conducted *Staphylococcus aureus* (ATCC 25923) and *Pseudomonas aeruginosa* (ATCC 9027) showing the same instant kill rate of the composition as compared to the control.

Example 5: Stability Study of Powder Disinfectant Composition

This example pertains to the stability and efficacy of the powder disinfectant composition after storage for 14 days at 54° C. The powder disinfectant composition evaluated was prepared from 0.5 g PVP K-30, 1.25 g EDTA, and 0.01 g silver nitrate. After 14 days at 54° C., the powder disinfectant composition was a white solid, did not change color, and maintained 99.999999% kill rate on exposure to *Escherichia coli* when exposed for just 15 seconds.

Example 5: Stability Study of Aqueous Solution of the Powder Disinfectant Composition 100 mL of an aqueous solution of the powder disinfectant compositions were prepared by dissolving 10 g of the powder disinfectant compositions into 100 mL distilled water. These aqueous solutions were maintained at room temperature, in sealed container, in a well-lighted area for a period of time. After these aqueous solutions underwent stability tests, each sample underwent ASTM E-2315 evaluation. Table 3 shows the powder compositions used in these tests. Table 4 shows these ASTM E-2315 results.

TABLE 3

| | | | | | | | | |
|---|---|---|---|---|---|---|---|---|
| Powder Disinfectant Compositions Tested | | | | | | | | |
| Experiment # | Formulation # | Amount EDTA (g) | Amount AgNO$_3$ (g) | Amount PVP K-30 (g) | Ppm silver | Aqueous Stability | | |
| 1 | 9 | 1.25 | 0.01 | 0.5 | 100 | 14 days. | | |
| 2 | 10 | 2.5 | 0.02 | 1.0 | 100 | 21 days | | |
| 3 | 11 | 2.5 | 0.02 | 1.0 | 100 | 28 days | | |
| 4 | 12 | 1.25 | 0.01 | 0.5 | 100 | 7 days | | |

TABLE 4

| | | | | | |
|---|---|---|---|---|---|
| Experimental Results for ASTM E-2315 Evaluation | | | | | |
| Experiment # | Formulation # | *S. aureus* Reduction | *E. coli* Reduction ( | *Pseudomonas aeruginosa* | Exposure Time |
| 1 | 9 | 99.99999 | 99.999999 | | 5 min |
| 2 | 10 | 99.99999 | 99.999999 | | 5 min |
| 3 | 11 | 99.99999 | 99.999999 | | 5 min |
| 4 | 12 | 99.99999 | 99.999999 | | 5 min |

What is claimed is:

1. A method for preparing a light stable powder disinfectant composition comprising:

a) contacting a solid chelating agent selected from the group consisting of citric acid, ascorbic acid, an ascorbate salt, a polyaminocarboxylic acid, a salt of a polyaminocarboxylic acid, an organic compound, a salt of an organic compound, and combinations thereof, with at least one solid metal salt forming a mixture; and b) contacting the mixture from step (a) with a hydrophilic polymer forming the powder metal ion disinfectant composition wherein the hydrophilic polymer is selected from the group consisting of polyacrylamide, a poly(acrylamide-co-acrylic acid), poly(vinyl alcohol), poly (ethylene oxide), water soluble polyurethane, carboxy methyl cellulose, lipids, glycerolipids, fatty acid lipid polymers, oligosaccharides, glycerols, and combinations thereof;

wherein the hydrophilic polymer has a mole % ranging from about 0.002 mole % to about 0.50 mole % relative to the composition;

wherein the powder metal ion disinfectant does not comprise nanoparticles; and wherein the powder disinfectant composition has a residual water content of less than 0.1 weight %.

2. The method according to claim 1, wherein the chelating agent to the at least one metal has a weight ratio ranging from 200.0:1.0 to about 20.0:1.0.

* * * * *